US005793629A

United States Patent [19]

Ishida et al.

[11] Patent Number: 5,793,629

[45] Date of Patent: Aug. 11, 1998

[54] DISTRIBUTED PROCESSING UNIT

[75] Inventors: Takeshi Ishida, Saitama-ken; Genzo Yoshizawa, Tokyo, both of Japan

[73] Assignee: Kabushiki Kaisha Nippon Conlux, Japan

[21] Appl. No.: 586,835

[22] PCT Filed: May 12, 1995

[86] PCT No.: PCT/JP95/00912

§ 371 Date: Jan. 11, 1996

§ 102(e) Date: Jan. 11, 1996

[87] PCT Pub. No.: WO95/31796

PCT Pub. Date: Nov. 23, 1995

[30] Foreign Application Priority Data

May 13, 1994 [JP] Japan .................................... 6-100159

[51] Int. Cl.[6] .......................... G05B 15/00; G06F 13/20; G06F 13/14; G07F 7/00

[52] U.S. Cl. .................... 364/131; 364/479.02; 395/847; 395/868; 194/217

[58] Field of Search ......................... 364/479.01, 479.02, 364/479.03, 131; 194/217, 218; 395/843, 847, 868, 884

[56] References Cited

U.S. PATENT DOCUMENTS

| | | | |
|---|---|---|---|
| 4,004,277 | 1/1977 | Gavril | 395/843 |
| 4,562,533 | 12/1985 | Hodel et al. | 364/200.67 |
| 4,598,379 | 7/1986 | Awane et al. | 364/479.02 |
| 4,616,323 | 10/1986 | Hayashi | 364/479.02 |
| 4,701,870 | 10/1987 | Mogi et al. | 364/580 |
| 4,787,050 | 11/1988 | Suzuki | 364/479.04 |
| 4,812,629 | 3/1989 | O'Neil et al. | 235/383 |
| 4,872,541 | 10/1989 | Hayashi | 194/217 |
| 5,113,990 | 5/1992 | Gabrius et al. | 194/206 |
| 5,136,694 | 8/1992 | Belt et al. | 395/887 |
| 5,280,585 | 1/1994 | Kochis et al. | 395/868 |
| 5,330,041 | 7/1994 | Dobbins et al. | 194/206 |
| 5,355,988 | 10/1994 | Shirasawa | 194/217 |
| 5,464,087 | 11/1995 | Bounds et al. | 194/200 |

FOREIGN PATENT DOCUMENTS

| | | |
|---|---|---|
| 61-136168 | 6/1986 | Japan . |
| 61-136168A | 6/1986 | Japan . |
| 63-58700 | 3/1988 | Japan . |
| 1-302488 | 12/1989 | Japan . |
| 2-27596 | 1/1990 | Japan . |
| 3-90952 | 4/1991 | Japan . |
| 5-233914 | 10/1993 | Japan . |
| 5-233914A | 10/1993 | Japan . |
| 6-103510 | 12/1994 | Japan . |

*Primary Examiner*—Reba I. Elmore
*Assistant Examiner*—Robert J. Dolan
*Attorney, Agent, or Firm*—Handal & Morofsky

[57] ABSTRACT

A distributed processing unit which permits easy modification of set data that has been written in a memory (19) of a coin mechanism (1) which constitutes a processor without the use of special terminals. When set data settings stored in the memory (19) of the coin mechanism (1) are to be modified, the coin mechanism (1) is disconnected from a signal line (8) from an automatic vending machine controller (2) at a connector (9), and a computer (50) is connected to the connector (9). In this state, the program routine of a CPU (11) in the coin mechanism (1) is modified by special instructions transmitted from the computer (50), thus permitting the contents of the memory (19) of the coin mechanism (1) to be read out by the computer (50) and the set data in the memory (19) to be rewritten by operation of the CPU (11).

18 Claims, 4 Drawing Sheets

DISTRIBUTED PROCESSING UNIT

TECHNICAL FIELD

The present invention relates to a distributed processing unit comprising at least one processor connected to a main controller through a signal line, and more particularly to a distributed processing unit designed so that set data stored in a memory of each processor can be read from and written to externally, thus facilitating modification of set data in each processor.

BACKGROUND ART

Distributed processing units recently proposed for use in automatic vending machines and the like include those comprising functional devices, for example, coin mechanisms which incorporate coin selectors, bill discriminators, card reader/writers, article conveyers, panel display units, and the like, which are connected in a distributed configuration to a main controller through a signal line.

In automatic vending machines and the like configured as distributed processing units of this type, the various functional devices communicate with the main controller through a signal line and perform their respective function processes.

For example, in a coin selector, data pertaining to permissible values for use in discriminating among coins, that is, upper limit values and lower limit values which define a permissible level range for each coin, is pre-stored in a memory as set data. The characteristics of inserted coins are measured by a measurement sensor, and the signals obtained thereby are compared with the set data stored in the memory in order to determine the validity and denomination of the inserted coins.

In a bill discriminator, data pertaining to permissible values for use in discriminating between bills, that is, upper limit values and lower limit values which define permissible level ranges for the plurality of measurement points on each bill, is pre-stored in a memory as set data, the characteristics of inserted bills at each measurement point are measured by a measurement sensor, and the signals obtained thereby are compared with the set data stored in the memory in order to determine the validity and denomination of the inserted bills.

In a card reader/writer, identification data for identifying cards is pre-stored in a memory as set data, the characteristics of the identification data of'an inserted card are measured by a measurement sensor, and the signals obtained thereby are compared with the set data stored in the memory in order to determine the validity and denomination of the inserted coins.

In conventional distributed processing units of this type, set data to be stored in a memory is specified in advance and the set data is written into a memory (ROM) using a ROM writer or the like. This ROM is installed in the coin selector, bill discriminator, card reader/writer, and the like so as to be installed in each functional device.

However, with the foregoing configuration, it is not possible to specify set data adapted to variations in measurement sensors and other components of individual functional devices.

Also, designs for a coin selector in which a dedicated terminal for connection with a computer is provided, the computer is connected to this terminal so that measured values of coin characteristics are collected by the computer, permissible values for coin selection (upper limits and lower limits which define permissible ranges for valid coins) are calculated from the collected and measured values of the coin characteristics, the permissible values for coin selection are written into ROM using a ROM writer., and the ROM to which the permissible values for coin selection have been written is installed in the coin selector have been proposed, for example in Japanese Laid-Open Patent Application 5-233914, but such designs require the provision of a special dedicated terminal for connection with the computer and of a ROM writer for writing the permissible values for coin selection which have been calculated by the computer to the ROM.

An object of the present invention is to provide a distributed processing unit which permits easy modification of set data that has been written to the memory of each processor without the use of special terminals.

DISCLOSURE OF THE INVENTION

In order to achieve the above-mentioned object, this invention is a distributed processing unit comprising at least one processor connected in a distributed configuration to a main controller through a signal line so that the processor communicates with the main controller through the signal line to perform specified processes, wherein the processor comprises a memory for storing set data for performing specified processes, a control unit for performing specified processes on the basis of the set data stored in the memory, and a connector for selectively connecting the control unit to the signal line or to external data processing means, and wherein the control unit comprises control means for communicating with the external data processing means according to special instructions sent from the external data processing means through the connector, and for rewriting the set data in the memory in response to a data write request from the external data processing means when the external data processing means is connected to the connector.

The present invention employs a connector for connecting the control unit of each processor to a signal line from the main controller so that settings in the set data that has been written to the memory of each processor can be modified.

This configuration makes it possible to modify settings in set data written to the memory of each processor without providing special terminals to each processor.

In addition, modification of settings in the set data written to a memory is performed by the control unit of each processor, thus obviating the need for a ROM writer.

BEST MODE FOR CARRYING OUT THE INVENTION

An embodiment of the distributed processing unit which pertains to this invention will be described in detail below with reference to the appended drawings.

Figure 1:
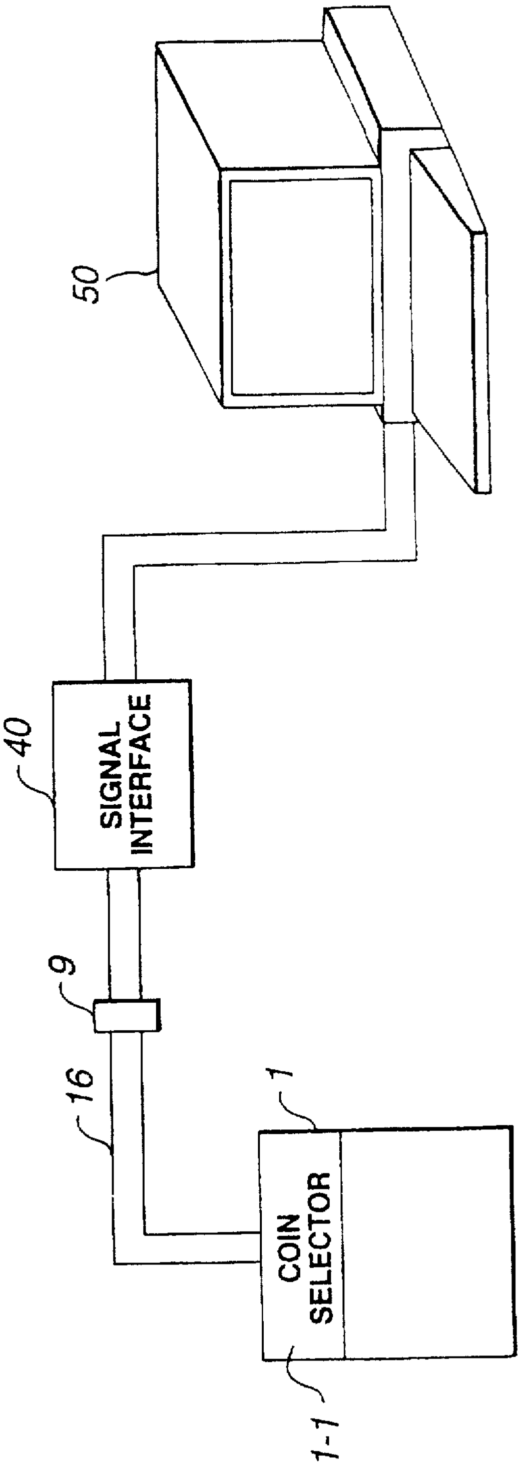
FIG. 1 is a connection diagram depicting connection of a computer to a coin mechanism of an automatic vending machine in an embodiment of the present invention.
Figure 2:
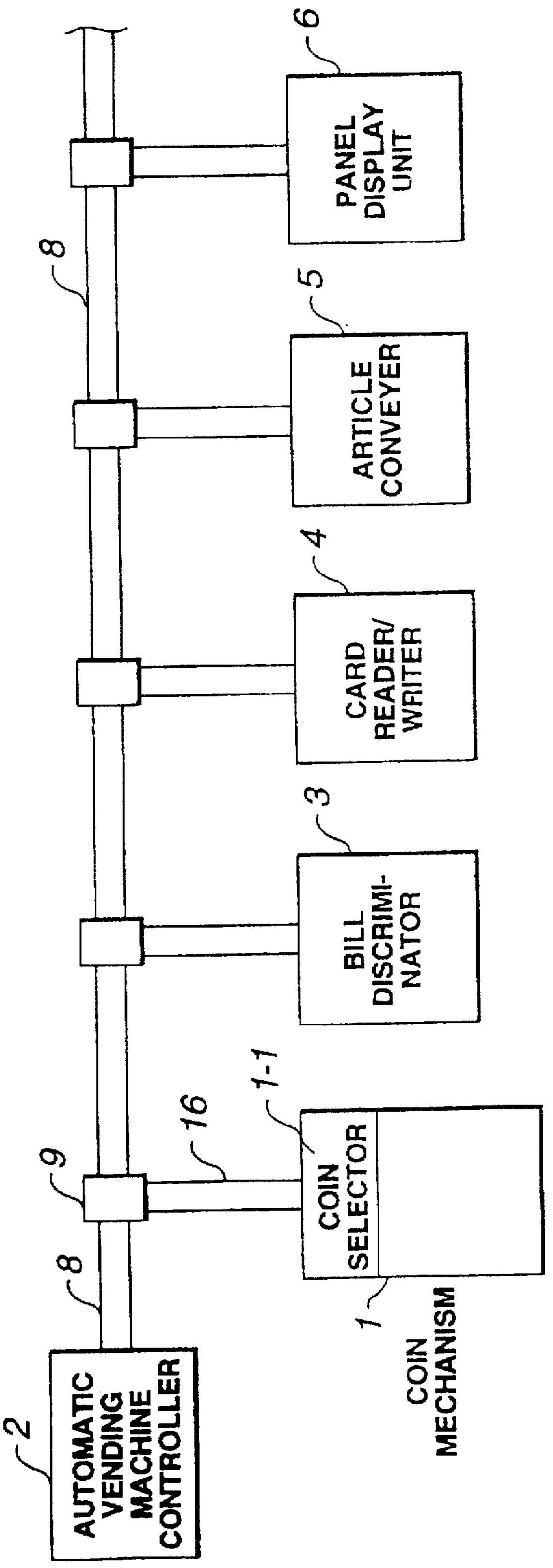
FIG. 2 is a block diagram depicting the overall configuration of an automatic vending machine in which the invention is implemented.

FIG. 1 depicts connection of a computer 50 to a coin mechanism 1 of an automatic vending machine which has been configured implementing the distributed processing unit of this invention. FIG. 2 depicts the overall configuration of an automatic vending machine which has been configured implementing the distributed processing unit of this invention.

In FIG. 2, the automatic vending machine is configured as a distributed processing unit wherein various processor-equipped functional devices such as a coin mechanism 1, a bill selector 3, a card reader/writer 4, a article conveyer 5, a panel display unit 6 are connected in a distributed configuration to an automatic vending machine controller 2 which is a main controller through a main signal line 8.

In this automatic vending machine, the functions of the individual processors, that is, the coin mechanism 1, the bill discriminator 3, the card reader/writer 4, the article conveyer 5, and the panel display unit 6, are activated in response to control signals from the automatic vending machine controller 2, and the responses produced as a result thereof are returned to the automatic vending machine controller 2 as necessary, so as to perform the functions of the automatic vending machine.

The individual processors, that is, the coin mechanism 1, the bill discriminator 3, the card reader/writer 4, the article conveyer 5, and the panel display unit 6, are each connected to the signal line 8 through switchable connectors 9.

For example, the coin mechanism 1 is provided with a coin selector 1-1 for selecting among inserted coins, and this coin mechanism 1 is connected to the signal line 8 from the automatic vending machine controller 2 through an a device signal line 16 and a connector 9.

When set data stored in the memory of the coin mechanism 1 is to be overwritten, the signal line 8 is disconnected from the connector 9 and a computer 50 is connected to the connector 9 through a signal interface 40, as shown in FIG. 1, so that the set data stored in the memory of the coin mechanism 1 can be overwritten under the control of the computer 50.

Figure 3:
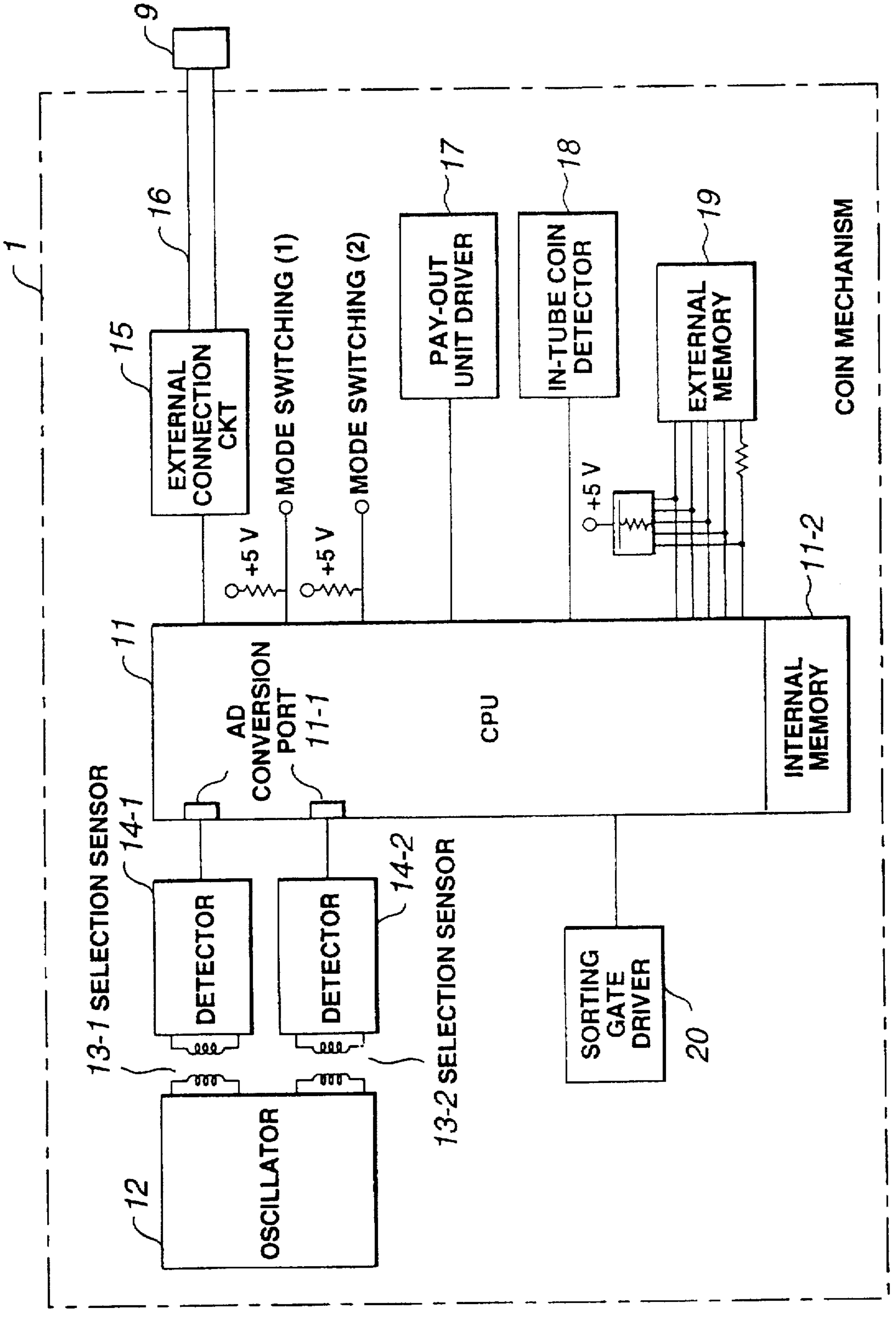
FIG. 3 is a block diagram depicting details of the configuration of the coin mechanism depicted in FIG. 1.

FIG. 3 is a block diagram depicting details of the configuration of the coin mechanism 1.

In FIG. 3, the coin mechanism 1 is provided with selection sensors 13-1 and 13-2 for selecting among inserted coins, each of which is provided with a transmission coil and a reception coil. The transmission coils of the selection sensors 13-1 and 13-2 are connected to an oscillator 12, and the reception coils of the selection sensors 13-1 and 13-2 are connected to detectors 14-1 and 14-2.

When a coin passes between the transmission coils and the reception coils of the selection sensors 13-1 and 13-2, a mutual inductance between the coils changes depending on the material of the coin whereby the, voltage induced in the reception coils of the selection sensors 13-1 and 13-2 changes.

The detectors 14-1 and 14-2 detect the change in the voltage and input a measured value for the coin to an A/D conversion port 11-1 of the central processing unit (CPU) 11 which constitutes the control unit.

The CPU 11 compares the measured value with the upper limit values and lower limit values stored in an external memory 19 that define permissible level ranges for coins, and determines that the coin is valid if the measured value falls between the upper limit values and lower limit values.

Upper limit values and lower limit values are set with reference to each denomination, and the CPU 11 compares the measured value with these denomination-specific upper limit values and lower limit values to determine the validity and denomination of the inserted coins. A sorting gate driver 20 is operated in accordance with a result of the determination so that coins determined to be valid are sorted by denomination into coin tubes or a safe (not shown), and so that false coins are returned.

When the coins have been sorted, the CPU 11 computes the inserted amount from the coin denominations and the number of coins inserted and notifies the automatic vending machine controller 2 of the result, whereupon the article conveyer 5 shown in FIG. 2 is controlled by instructions from the automatic vending machine controller 2 so that the article is dispensed and, if change is to be returned, a change pay-out unit driver 17 is operated so that change is paid out from the coin tubes.

The CPU 11 also controls the discharge of valid coins of a given denomination to the safe when an in-tube coin detector 18 has detected that a coin tube is full.

The CPU 11 also controls to display an"out of change" message as necessary if the in-tube coin detector 18 detects that a coin tube is empty.

The reference numeral 11-2 indicates an internal memory provided internally to the CPU 11.

In the foregoing description, the use of changes in the mutual inductance between the coils of the selection sensors 13-1 and 13-2 was described, but a configuration in which changes in a capacitance or the like, or in which a combination of a plurality of sensors which operate on different principles is employed, could be used to improve reliability.

In this embodiment, the CPU 11 of the coin mechanism 1 is connected to the connector 9 through a communications means comprising an external connection circuit 15 and an external connection signal line 16; during normal operation, the connector 9 is connected to the signal line 8 from the automatic vending machine controller 2.

When the set data stored in the external memory 19 of the coin mechanism 1 is to be overwritten, the signal line 8 is disconnected from the connector 9 and a computer 50 is connected to the connector 9 through a signal interface 40, as shown in FIG. 1, so that the set data stored in the memory of the coin mechanism can be overwritten under the control of the computer 50.

Specifically, when the signal line 8 is disconnected from the connector 9 and the computer 50 is connected to the connector 9 through the signal interface 40, as shown in FIG. 1, special instructions (special commands) not used in normal operation can be transmitted from the computer 50; the CPU 11 software enables data exchange with the computer 50 when the CPU 11 of the coin mechanism 1 receives the special instructions.

It is possible to use another control device (dedicated external input/output means) that performs operations like those of the computer 50 in place of the computer 50 in this process.

Figure 4:
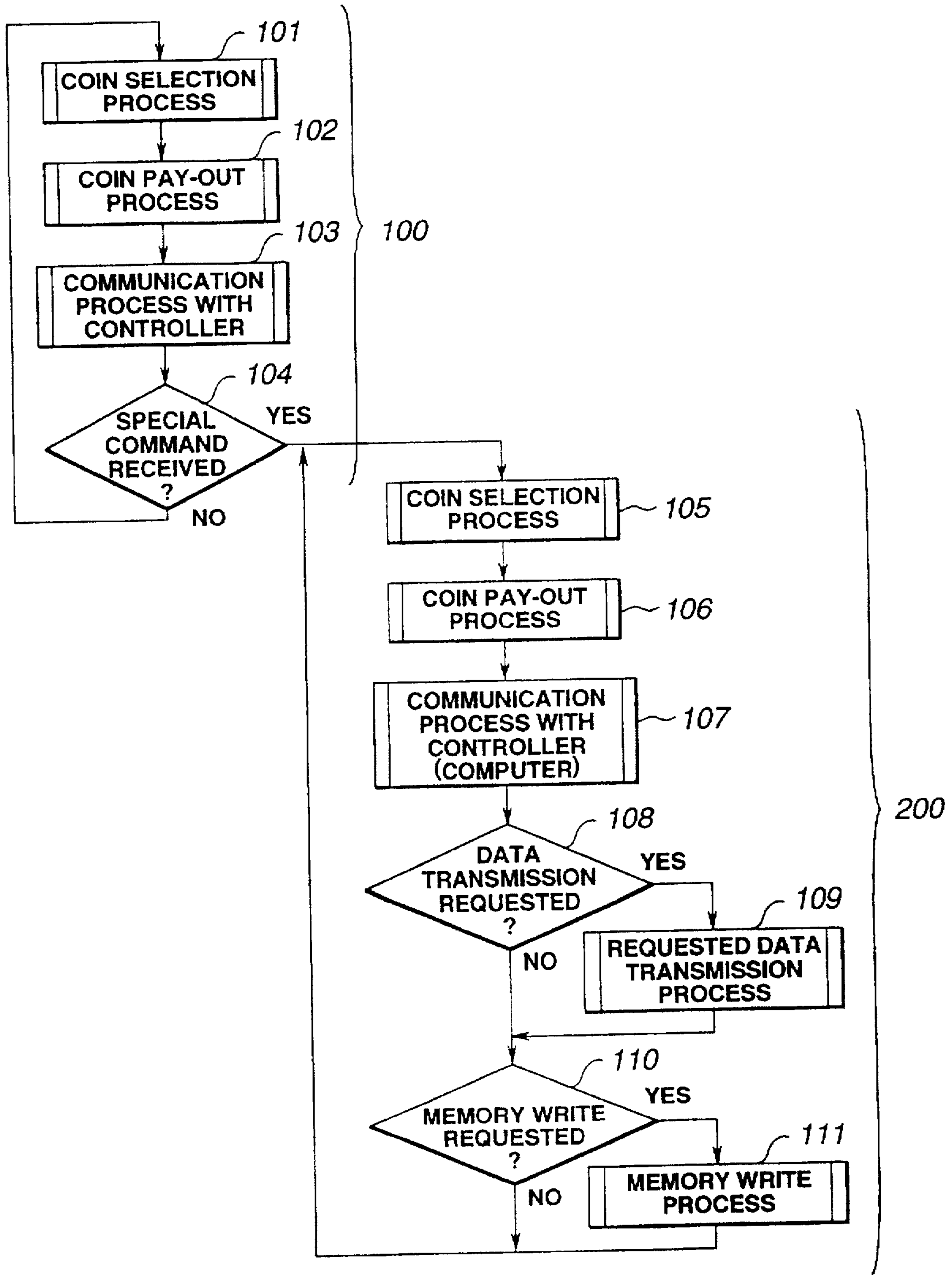
FIG. 4 is a flow chart which explains the operation of the coin mechanism depicted in FIG. 1.

FIG. 4 is a flow chart depicting the operation of the CPU 11 of the coin mechanism 1. In the normal coin processing routine 100, the CPU 11 of the coin mechanism 1 executes a coin selection process routine 101 for discriminating among inserted coins, a coin pay-out process routine 102 for paying out change, and a communication routine 103 with the automatic vending machine controller 2, in this order.

In an update inquiry routine 104, CPU 11 interrogates automatic vending machine controller 103 to determine whether an update command has been received. If not, the operation returns to the beginning of the normal coin processing routine 100.

If the CPU 11 of the coin mechanism 1 detects controller 2 has received an update command, as noted above, operation of the device proceed normally but with modifications, making communication with computer 50 possible.

Specifically, when the special command is detected in step 104, a computer connection routine 200 is initiated, and a coin selection process routine 105, a coin pay-out process routine 106, and a communication routine 107 comparable to those in the normal routine 100 are executed, except that communication is made with computer 50 rather than control unit 2. In communication routine 107, CPU 11 now communicates with computer 50 and executes a data transmission request routine 108 and a memory write request routine 110.

When a data transmission request is received from the computer 50, a transmission process routine 109 for transmitting the requested data is executed; when a memory write request is received (110), a memory write process routine 111 is executed.

The data trans mission process routine 109 includes a process whereby the contents of memory at addresses specified by the computer 50 are transmitted from the coin mechanism 1, and a process whereby predetermined data are transmitted to the coin mechanism 1 on instructions from the computer 50.

The memory write process routine 111 includes a process whereby data transmitted by the computer 50 is written at the coin mechanism 1 side to the memory 19 at addresses transmitted from the computer 50, and a process whereby predetermined data transmitted by the computer 50 is stored at the coin mechanism 1 side in determined memory addresses. For example, the CPU 11 of the coin mechanism 1 transmits to the computer 50 measured values (from each of the selection sensors 13-1 and 13-2) for the plurality of valid coins which have been inserted; the computer 50 then processes these measured values separately for each of the selection sensors 13-1 and 13-2 and computes, from standard distributions of these measured values, upper limit values and lower limit values which define permissible level ranges for each coin.

The foregoing process is conducted with inserted coins of different denominations to determine upper limit values and lower limit values which define permissible level ranges for coins of different denominations.

The upper limit values and lower limit values which define permissible level ranges for coins, which have been determined by the computer 50, are then transmitted from the computer 50 to the coin mechanism 1, and the coin mechanism 1 writes these values as set data into the external memory 19 under the control of the CPU 11.

The coin mechanism 1 subsequently determines the denomination and validity of inserted coins based on the set data which has been written to the external memory 19.

By means of this configuration, no special signal terminal is required for writing set data to the external memory 19, and the need for a dedicated writer for writing to the memory 19 is obviated. In addition, measured data for a coin can b e collected simply by inserting the coin, as long as the coin can be accepted mechanically, so it is possible to modify denominations of acceptable coins.

In the foregoing description, the case of overwriting set data in the external memory 19 of the coin mechanism 1 was described; the present invention may be implemented similarly in the case of the bill discriminator 3 and the card reader/writer 4.

In the case of the bill discriminator 3, measured values for a plurality of measurement points on an inserted bill for each selection sensor are transmitted to the computer 50, the data from each of the selection sensors is processed by the computer 50, permissible ranges for measured values are computed from normal distributions of these measured values, and upper limit values and lower limit values of these permissible ranges are determined for each selection sensor.

The foregoing process is conducted with different inserted bills to determine upper limit values and lower limit values which define permissible level ranges for bills of different denominations for each selection sensor.

The upper limit values and lower limit values of permissible level ranges for bills of different denominations which have been determined by the computer 50 are transmitted from the computer to the bill discriminator 3, and the bill discriminator 3 itself writes the data to a memory (not shown) of the bill discriminator 3.

Thus, the bill discriminator 3 subsequently treats an inserted bill as genuine when selection data for the bill falls within the permissible range for selection data which has been written in the memory, and treats it as counterfeit when the data does not fall within the permissible range.

In the case of the card reader/writer 4, the write process by the computer 50 is used for writing to a memory of the card reader/writer 4 data such as card ID, customer code, and other identification data which is written on the card itself.

The card reader/writer 4 subsequently determines the validity of an inserted card on the basis of the data which has been written to the memory.

With this method, it becomes unnecessary to produce memories with different memory contents for different cards, so a single device can be adapted to any particular acceptable card.

In addition, in the case of change of acceptable cards, it is not necessary to disassemble the device, so it can be adapted quickly to such modifications.

INDUSTRIAL APPLICABILITY

According to this invention, in a distributed processing unit comprising at least one processor. connected in a distributed configuration to a main controller through a signal line so that the processors communicate with the main controller through the signal line to perform specified processes, a control unit of each processor is configured such that settings of set data which has been written to the memories of the processors can be modified using connectors which connect to the signal line coming from the main controller, thereby permitting modification of the set data which has been written to the memories of the processors without the need to provide each processor with a special terminal. In addition, modification of set data which has been written to the memories is performed by the control unit of each processor, obviating the need for a ROM writer or the like.

We claim:

1. A distributed processing unit having at least one functional device to perform a device-specific process, a main controller to issue control signals to each said functional device and receive responses therefrom and a main signal line connecting each said functional device in a distributed configuration with the main controller for communication of the control signals and responses, wherein each said functional device comprises:

a) a read-write memory for storing set data used in performing the device-specific process;

b) a device data processor having a control program to control performance of the device-specific process using the stored set data;

c) a switchable connector for selectively connecting the functional device to the main signal line or to an external computer, whereby the functional device is disconnected from the main signal line when connected to the external computer; and d) communication means for the functional device to communicate with the external computer when connected therewith;

wherein the switchable connector is switched to connect with the external computer in response to a control signal received by the functional device from the main controller and wherein the control program provides direct memory write access to the external computer to enable the external computer to rewrite the set data in the functional device's read-write memory.

2. A distributed processing unit as defined in claim 1, wherein the functional device is a coin selector and the set data stored in the respective memory is permissible value data for use in coin discrimination.

3. A distributed processing unit as defined in claim 1, wherein the functional device is a bill discriminator and the set data stored in the respective memory is permissible value data for use in bill discrimination.

4. A distributed processing unit as defined in claim 1, wherein the functional device is a card reader-writer and the set data stored in the respective memory is identification data for identifying cards.

5. A distributed processing unit as defined in claim 1, wherein the functional device comprises:

transmission means for transmitting requested data to the external computer in response to a request for data transmission from the external computer, and wherein the external computer comprises processing means for processing the specified data transmitted from the main controller and creating the set data in the respective memory.

6. A distributed processing unit as defined in claim 9, wherein the functional device is a coin selector, the transmission means transmits detected data for a plurality of valid coins to the external computer, and the external computer creates permissible value data for discriminating among coins from normal distributions of the detected data of the plurality of valid coins.

7. A distributed processing unit as defined in claim 9, wherein the functional device is a bill discriminator, the transmission means transmits detected data of a plurality of valid bills to the external computer, and the external computer creates permissible value data for discriminating among bills from normal distributions of the detected data of the plurality of valid bills.

8. A distributed processing unit for an automatic vending machine, the unit having:

multiple functional devices to perform a respective one of multiple device-specific processes for operation of the vending machine, the device-specific processes including currency discrimination and article conveying;

a main controller to issue control signals to each said functional device and receive responses therefrom; and a main signal line connecting each said functional device in a distributed configuration with the main controller for communication of the control signals and responses;

wherein each said functional device comprises:

a) a read-write memory for storing set data used in performing the device-specific process;

b) a device data processor having a control program to control performance of the device-specific process using the stored set data;

c) a switchable connector for selectively connecting the functional device to the main signal line or to an external computer, whereby the functional device is disconnected from the main signal line when connected to the external computer; and d) communication means for the functional device to communicate with the external computer when connected therewith;

wherein the switchable connector is switched to connect with the external computer in response to a control signal received by the functional device from the main controller and wherein the control program provides direct memory write access to the external computer to enable the external computer to rewrite the set data in the functional device's read-write memory.

9. A distributed processing unit according to claim 8 wherein the currency discrimination functional device collects and stores sensed data on currency inserted into the vending machine, said read-write memory includes storage areas for said sensed data and wherein the currency discrimination functional device can be updated with new set data processed from the sensed data stored by the functional device, the new set data being generated by the external computer, when the currency discrimination functional device is connected with the external computer.

10. A distributed processing unit according to claim 8 wherein the at least one functional device comprises a coin-discriminating device, a bill discriminating device, a card reader-writer device and an article-conveyor device.

11. A distributed processing unit according to claim 8 wherein the functional device control program includes a step of communicating with the main controller to determine whether the main controller has received an update request from the external computer for the functional device and wherein the switchable connector is switched to connect the functional device with the external computer in response to detection of the update request.

12. A distributed processing unit according to claim 11 wherein the external computer posts an update request for a specific functional device with the main controller.

13. A distributed processing unit according to claim 9 wherein the functional device control program further includes a step of communicating with the external computer and executing a data transmission process or a memory write process under the control of the external computer.

14. A distributed processing unit according to claim 13 wherein the data transmission process comprises downloading prespecified memory address contents containing sensed currency variability parameters to the external computer.

15. A distributed processing unit for an automatic vending machine, the unit having:

multiple functional devices to perform a respective one of multiple device-specific functional processes for operation of the vending machine, the device-specific functional processes including currency discrimination and article conveying whereby the devices comprise a currency discrimination device and an article conveying device, each functional device using device-specific set data;

a main controller to issue control signals to each said functional device and receive responses therefrom;

a main signal line connecting each said functional device in a distributed configuration with the main controller for communication of the control signals and responses between the main controller and the functional devices; and communication means enabling each functional device to communicate with an external computer;

wherein each said functional device comprises:

a) a read-write memory for storing the set data used in performing the device-specific process; and b) a device data processor having a control program to control performance of the device-specific process using the stored set data in response to the control signals received from the main controller and to generate the responses received by the main controller;

and wherein the currency discrimination functional device collects and stores sensed data on currency inserted into the vending machine, said read-write memory includes storage areas for said sensed data and wherein the currency discrimination functional device can be updated with new set data processed from the sensed data stored by the functional device, the new set data being generated by the external computer, when the currency discrimination functional device is connected with the external computer.

16. A distributed processing unit according to claim 15 wherein each said functional device comprises a switchable connector for selectively connecting the functional device to the main signal line or to an external computer, whereby the the functional device is disconnected from the main signal line when connected to the external computer.

17. A distributed processing unit according to claim 16 wherein the switchable connector is switched to connect with the external computer in response to a control signal received by the functional device from the main controller and wherein the control program provides direct memory write access to the external computer to enable the external computer to rewrite the set data in the functional device's read-write memory.

18. A distributed processing unit according to claim 15 wherein the multiple functional devices comprises a coin-discriminating device, a bill discriminating device, a card reader-writer device and an article-conveyor device.

* * * * *